Dec. 14, 1926.  
F. R. PORTER  
1,610,314  
INTERNAL COMBUSTION ENGINE  
Filed Feb. 7, 1921   2 Sheets-Sheet 1
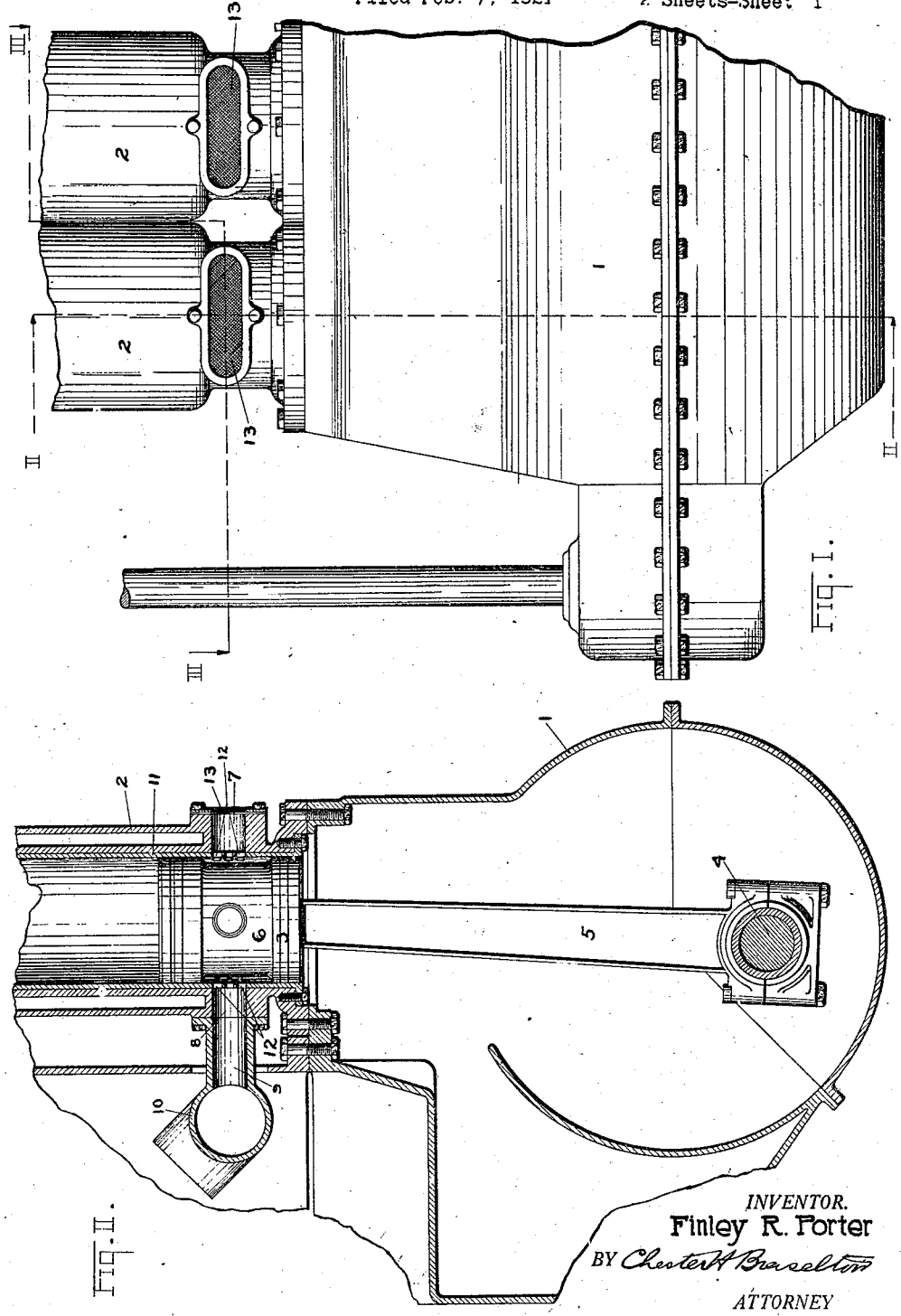
INVENTOR.  
Finley R. Porter  
BY Chester H. Braselton  
ATTORNEY Dec. 14, 1926.  
F. R. PORTER  
1,610,314  
INTERNAL COMBUSTION ENGINE  
Filed Feb. 7, 1921   2 Sheets-Sheet 2
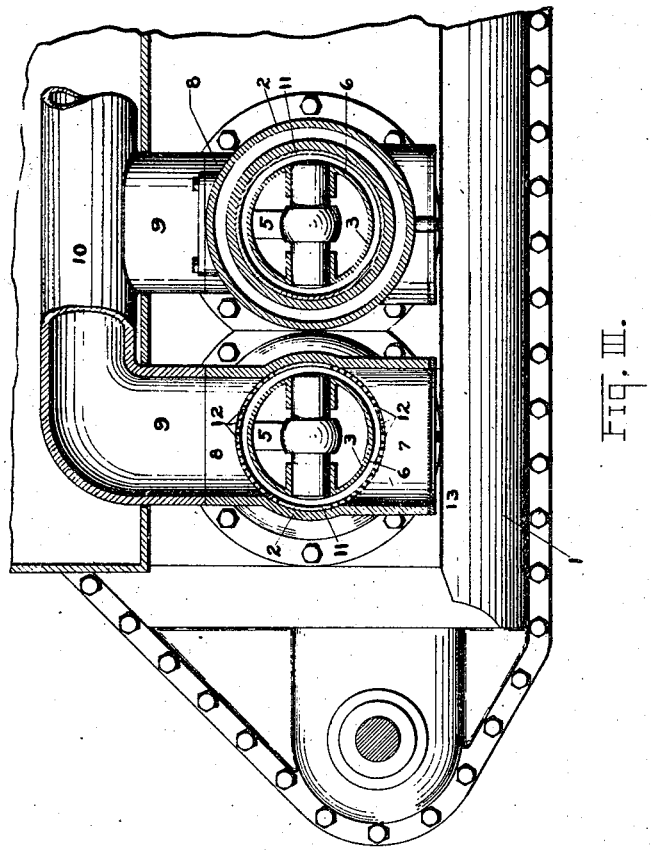
Fig. III.
INVENTOR.  
Finley R. Porter  
BY Chester H Braselton  
ATTORNEY Patented Dec. 14, 1926.

1,610,314

UNITED STATES PATENT OFFICE.

FINLEY R. PORTER, OF PORT JEFFERSON, NEW YORK, ASSIGNOR TO KNIGHT AMERICAN PATENTS COMPANY, OF CHICAGO, ILLINOIS, A CORPORATION OF DELAWARE.

INTERNAL-COMBUSTION ENGINE.

Application filed February 7, 1921. Serial No. 443,217.

My invention broadly comprises means for subjecting the piston to the direct contact with the air being fed to the carburetor when the piston is at one portion of its stroke whereby the double object is obtained of cooling the piston and of heating the air, to render the engine more effective.

Another object is to provide the piston with a circumferential recess intermediate its ends which shall act to intercept gaseous or liquid fuel that may leak by the piston rings and the provision of means for drawing air through said recess for the purpose of absorbing or mixing with said fuel and carrying it back to the carburetor.

My invention more particularly comprises improvements in the construction, form and arrangement of certain of the parts whereby the air being fed to the carburetor is caused to pass transversely through the cylinder at points where it will be forced to pass around the piston and in direct contact therewith when the piston is at one portion of its stroke, the piston preferably having a circumferential groove which will be brought into alignment with the air inlet and outlet ports of the cylinder.

A practical embodiment of my invention is represented in the accompanying drawings, in which:

Figure I represents, in elevation, a portion of a multi-cylinder internal combustion engine with my invention applied thereto.

Figure II is a section taken in the plane of the line II—II of Figure I, and

Figure III is a section taken in the plane of the line III—III of Figure I.

The crank shaft casing is denoted by 1 and the longitudinally arranged cylinders by 2. Pistons 3 are fitted to reciprocate in the cylinders 2 and are connected to the crank shaft 4 by the usual rods 5.

Each piston 3 is provided with a circumferential groove 6 intermediate its ends. Each cylinder 2 is provided with an air inlet port 7 and an air outlet port 8 arranged, in the present instance, diametrically opposite each other. The air outlet port 8 is connected to the branch 9 of the intake manifold pipe 10 which leads to the carburetor, not shown. In the present instance, I have shown the cylinder as provided with a lining 11, the said lining having perforations 12 opposite the air inlet and outlet ports 7 and 8. The air inlet port 7 may be provided with a suitable screen 13.

The parts are preferably so arranged that when the piston 3 is at or near the limit of its rearward movement, the circumferential groove 6 therein will be brought into alignment with the air inlet and outlet ports so that the air as it passes transversely through said ports and the cylinder on its way to the carburetor will be caused to pass around the piston within the circumferential groove 6 thus submitting the piston at this point in its stroke to the direct action of incoming air serving to cool the piston and, at the same time, to heat the air thus adding materially to the efficiency of the engine.

At the same time any gaseous or liquid fuel that may have escaped past the piston rings is caught in the recess mixed with the air passing therethrough and carried to the carburetor or intake manifold. The perforated baffles in the inlet and outlet ports break the air current up into jets and eddies, which is conducive to more thorough mixing of the air with the fuel elements. This results in a saving of fuel and prevents dilution of the oil in the crank case by liquid fuel escaping thereinto.

It is obvious that this invention might be applied to engines having any number of cylinders and to engines of various types; hence I do not wish to limit myself to the particular construction herein shown and described.

What I claim as new and desire to secure by Letters Patent is:

1. In an internal combustion engine, a cylinder, a piston, a circumferential recess surrounding said piston, an air inlet and outlet for said recess, said recess being constructed to intercept fuel leaking between the piston and cylinder, vacuum means for conducting air through said recess to the intake of the engine, and a mixing device in the air outlet.

2. An internal combustion engine having a cylinder and piston, a liner for said cylinder, a circumferential groove around said piston, a conduit leading from the atmosphere to the carburetor of which said circumferential groove is a part, said liner being constructed to form a perforated baffle in said conduit.

3. In an internal combustion engine, a cylinder, a piston, a recess in the outer wall of said piston, air inlet and outlet ports for said recess, means for conducting air from said recess outlet to the intake of the engine and a mixing device in one of said ports.

4. An internal combustion engine having a cylinder and piston, a liner for said cylinder, a circumferential groove around said piston, a conduit leading from the atmosphere to the carburetor of which said circumferential groove is a part, said liner being perforated adjacent the inlet and outlet ports of said conduit with reference to circumferential groove, the width of said perforated portion of liner being less than the width of the circumferential groove of the piston.

In testimony whereof, I affix my signature.

FINLEY R. PORTER.